G. K. ATKINSON.
CLUTCH.
APPLICATION FILED MAR. 27, 1911.
1,093,306.
Patented Apr. 14, 1914.
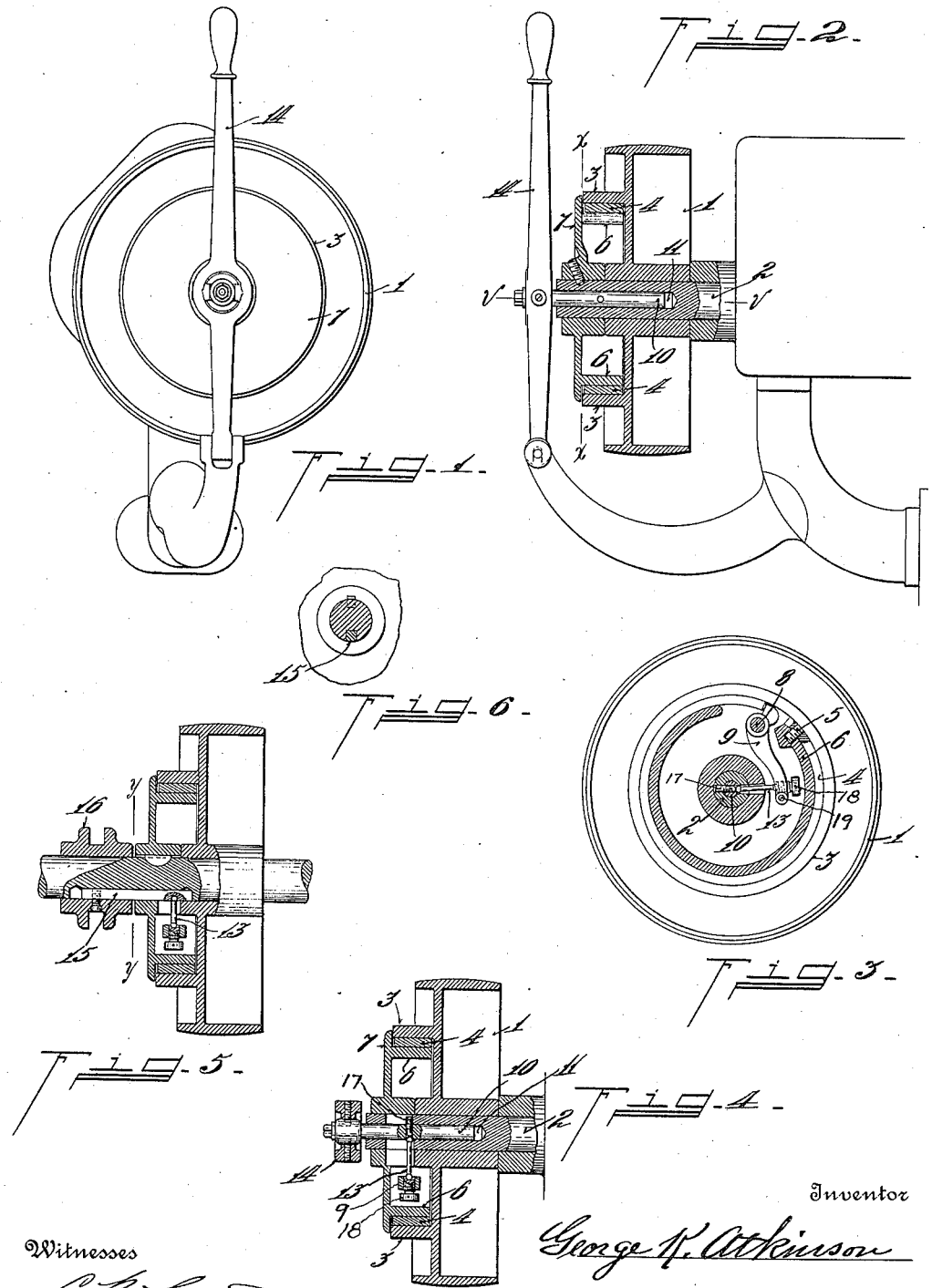

UNITED STATES PATENT OFFICE.

GEORGE K. ATKINSON, OF CINCINNATI, OHIO, ASSIGNOR OF ONE-HALF TO THE JOHN STEPTOE SHAPER COMPANY, OF CINCINNATI, OHIO, A CORPORATION OF OHIO.

CLUTCH.

1,093,306.  Specification of Letters Patent.  Patented Apr. 14, 1914.

Application filed March 27, 1911. Serial No. 617,051.

*To all whom it may concern:*

Be it known that I, GEORGE K. ATKINSON, a citizen of the United States, residing at Cincinnati, in the county of Hamilton and State of Ohio, have invented certain new and useful Improvements in Clutches, of which the following is a specification.

My invention relates to an improvement in friction clutches, and primarily of the split ring type.

One of the objects of my invention is to provide a friction clutch of the split ring type, in which a split ring is contracted and expanded within an annulus, and lever mechanism for controlling the same, and means for actuating said lever mechanism mounted within said ring, whereby such mechanism is completely housed.

Another object of my invention is to provide a friction clutch with a split ring adapted to be contracted and expanded within an annulus, forming one of the members of the clutch with lever mechanism for actuating said ring, and means for actuating said lever mechanism, comprising a slide rod, and link, whereby the position of link controls the movement imparted to the lever mechanism enabling all the operative parts to be mounted within the ring.

Another object of my invention is to provide a friction clutch with a split ring, adapted to be contracted and expanded within an annulus of the member to be driven with ring controlling means, in connection with the driving element adapted to be shifted to actuate the split ring.

The features of my invention are more fully set forth in the description of the accompanying drawings, forming a part of this specification, in which:—

Figure 1 is an end elevation of my improved friction clutch. Fig. 2 is a central vertical section thereof. Fig. 3 is a section on line $x$, $x$, Fig. 2. Fig. 4 is a section on line $v$, $v$, Fig. 2. Fig. 5 is a modified form, showing the shifting mechanism employed when the clutch is mounted upon a shaft, which will not permit of the end engagement thereof. Fig. 6 is a section on line $y$, $y$, Fig. 5.

In Figs. 1, 2, 3, and 4 my improved friction clutch is shown as mounted upon a machine tool, in which the clutch operating lever and connections therewith are mounted at the end of the driving shaft of the machine, while in Fig. 5 the clutch is shown as mounted upon a line shaft in which use it would be impracticable to bore the shaft so as to receive the actuating members. With this form of clutch, the elements are all housed or guarded, and eliminating any protuberances, with which an operator might come in contact, and therefore, my clutch has advantages in features of safety, as well as in mode of operation and results.

1 represents a pulley loosely mounted upon the shaft 2 which in Fig. 2 is the main driving shaft for the machine tool, and the pulley is the driving medium therefor, when belt connected and with the clutch mechanism operated to fix the pulley in driving engagement with the shaft 2. While I have shown a pulley, it is obvious that the same could be a gear, or any known power transmitting element, and the clutch mechanism is the connection between the driving and driven members.

3 represents an annular flange projecting from the web of the pulley 1. 4 represents a split ring, one end of which is fixed at 5, see Fig. 3, to the flange 6 of the disk 7 fixed or keyed to the shaft 2 so as to revolve therewith, and also form a housing or cover for the split ring and elements mounted within said split ring.

9 represents a bell crank lever pivotally mounted upon the stud pin 8 projecting from the disk 7, with one arm of said bell crank lever adapted to engage the loose end of the split ring 4 adapted when the lever is swung to expand the ring within the annular flange 3 to engage with the inner periphery thereof, and bind the disk and pulley together.

10 represents a slide rod slidably mounted within a bore 11, formed in the end of the shaft 2. To insure a unitary rotation of the rod 10 and shaft 2, a headless screw 17 is screw threaded into said rod and projects into a slot formed in the shaft.

13 represents a link having a ball and socket connection with the slide rod 10, and a ball and socket connection with one arm of the bell crank lever 9. Said link projecting through a slot formed in the hub of the disk 7 and into a slot formed in the shaft, see Fig. 4, to connect with the rod 10.

Fig. 4 shows the clutch elements in their active position with the connecting link 13, substantially in a diameter line with the shaft 2, after having been moved from an angular released position. Although its movement is comparatively slight it swings the bell crank lever 9 sufficiently to expand the ring 4, to frictionally clutch the disk 7 to the pulley 1. The diametric position of the link 13, aided by the pressure of the ring, tends to fixedly set it against accidental release. Shifting the rod 10 outward will angularly dispose the connecting points between rod 10 and arm of bell crank lever 9, lessening the distance between said members for releasing or contracting the split ring 4.

14 represents a hand lever pivotally connected to a suitable support projected from the frame of the machine and pivotally connected to the rod 10 to provide convenient means for sliding the rod 10 within the shaft bore.

The socket, of the ball and socket connection between the link 13 and lever 9 is formed in one end of an adjustable take-up screw 18, screw threaded into the end of said lever and adapted to be clamped in its adjusted position by a clamping screw 19, the end of the lever 9 being suitably slotted for this purpose. The inner end of the screw 17 of the rod 10 forms the bottom of the socket for the inner end of the link 13 and may be used for adjustment in connection with the take-up screw 18.

In the form shown in Fig. 5, the clutch is represented as applied to a line shaft, or at a point intermediate of the shaft ends, and in which the shaft could not be concentrically bored for insertion of the slide rod. In such instance, a slide bar 15 is provided, slidably mounted within a groove formed in the shaft, and with which the link 13 of the clutch mechanism has a ball and socket connection. This slide bar 15 is fixed to a sleeve 16, provided with an annular groove to receive the yoke arms or the like of an actuating lever, for shifting the sleeve and slide bar manipulating the clutch. The remainder of the clutch mechanism remaining substantially the same as heretofore described.

By this construction, a lever mechanism is provided, for controlling the split ring, completely housed and such as to offer the least resistance at the manipulating end, and the greatest power at the opposite end, at the same time locked in position while the clutch is in commission. The movement of the connecting link from an angular to straight line being the controlling factor in imparting the proper movement to the split ring operating lever, relieves the mechanism of the friction incident to clutch shifting mechanism employing a shifting conical sleeve engaging against a bell crank lever as commonly employed, and also enables the parts to be housed, coming within safety regulations now required for rapidly revolving or moving elements.

It may be said that the link 13 is a movable actuating member, having its ends guided in angularly disposed planes adapted to be moved for controlling the split ring lever mechanism, and when the ends of the link are alined to a dead center, brought entirely into one of the guiding planes, they form a lock against movement of the bell crank lever, but offer little resistance against the movement of the shifting lever. It is also obvious that various means may be employed for guiding the ends of the link in angularly disposed planes, other than those shown, without departing from the features of my invention. Further, the connections of the link ends are of ball and socket form, as illustrated, and of loose form but in which the movement is such that they cannot become disengaged, it is obvious however, that other forms of connections for the ends of the link may be employed within the province of my invention.

Having described my invention, I claim:—

1. A clutch mechanism, comprising two members, a clamping ring connected to one member, and adapted to be expanded, and clamped to the second member, a lever mechanism, for operating said ring mounted on the first member, and a link member, having its ends guided in oppositely disposed planes, and in connection with said lever mechanism, shifting means mounted and movable within the first member in connection with the opposite end of said link member, for moving the same to and from an end alined position and adjusting means interposed between said link and lever for regulating the lever movement.

2. A clutch mechanism comprising a driving and a driven member, a split ring interposed between said members, fixed to one and adapted to be clamped to the second, lever mechanism engaged with said split ring, a link connected with said lever mechanism with its ends adapted to be moved in relative right-angled planes, means mounted and movable within the driving member at right angles to the link for moving said link to and from a relative end alined position and adjusting means interposed between said link and lever for regulating the lever movement.

3. A clutch mechanism comprising a driven shaft, a driving member loose thereon, a driven member fixed on said shaft, a split ring interposed between said members fixed to one, and adapted to be clamped to the second, a lever engaging said split ring to expand the same, a link connected to said lever at one end and an actuating member movably mounted within said shaft and engaged with the opposite end of said link for moving the link in different planes for actuating said lever, and adjusting means interposed between said link and lever for regulating the lever movement.

4. A clutch mechanism comprising a shaft, a driving member concentric and loose thereon, a split ring interposed between said shaft and driving member, adapted to be frictionally clamped to the latter, means for expanding said ring, an actuating member movably mounted within said shaft, a link having one end thereof engaged with said actuating member, its opposite end with the expanding means, whereby the movement of the actuating member will change the angular plane of the link operating the expanding means and adjusting means interposed between said link and lever for regulating the lever movement.

5. A clutch mechanism comprising a driven shaft, a driving member concentric and loose thereon, having an annular flange projected therefrom, a driven member fixed on said shaft having its periphery parallel with said flange, a split ring interposed between said flange and driven member connected to one member, and adapted to be expanded to connect with the second member, a lever pivotally mounted within the driven member for expanding said ring, an actuating member movably mounted within the shaft, a link having one end socketed within the lever, its opposite end socketed within the actuating member, whereby in the movement of the actuating member the plane of the link will be varied for rocking said lever and adjusting means interposed between said link and lever for regulating the lever movement.

In testimony whereof, I have hereunto set my hand.

GEORGE K. ATKINSON.

Witnesses:
OLIVER B. KAISER,
EMMA SPENER.

---

Copies of this patent may be obtained for five cents each, by addressing the "Commissioner of Patents, Washington, D. C."